United States Patent
Dogu et al.

(10) Patent No.: US 10,387,663 B2
(45) Date of Patent: Aug. 20, 2019

(54) SYSTEM, A METHOD AND A COMPUTER READABLE MEDIUM FOR TRANSMITTING AN ELECTRONIC FILE

(71) Applicant: DIGITAL ARTS INC., Tokyo (JP)

(72) Inventors: Toshio Dogu, Tokyo (JP); Noriyuki Takahashi, Tokyo (JP)

(73) Assignee: DIGITAL ARTS INC., Tokyo (JP)

( * ) Notice: Subject to any disclaimer, the term of this patent is extended or adjusted under 35 U.S.C. 154(b) by 222 days.

(21) Appl. No.: 14/042,732

(22) Filed: Oct. 1, 2013

(65) Prior Publication Data
US 2014/0101773 A1    Apr. 10, 2014

(30) Foreign Application Priority Data

Oct. 4, 2012  (JP) .................. 2012-221826

(51) Int. Cl.
*G06F 21/60* (2013.01)
*G06F 21/62* (2013.01)
(Continued)

(52) U.S. Cl.
CPC ............ *G06F 21/606* (2013.01); *G06F 21/62* (2013.01); *G06F 21/6209* (2013.01);
(Continued)

(58) Field of Classification Search
CPC ............... H04L 63/0428; H04L 63/123; H04L 63/0471; H04L 63/0435; H04L 67/02;
(Continued)

(56) References Cited

U.S. PATENT DOCUMENTS 9,756,021 B2 *  9/2017  Favero ................. H04L 9/0869
2003/0147536 A1   8/2003  Andivahis et al.
(Continued)

FOREIGN PATENT DOCUMENTS

JP      2003-6506 A     1/2003
JP    2008-187280 A     8/2008
(Continued)

OTHER PUBLICATIONS

Office Action issued for counterpart Japanese Application 2012-221826, issued by the Japanese Patent Office dated Sep. 2, 2014.
(Continued)

*Primary Examiner* — Tae K Kim

(57) ABSTRACT

Provided is an electronic file transmission system comprising a data acquiring section that acquires data including an electronic file that is created or attached by a first communication terminal; an extracting section that extracts from the data the electronic file and recipient identification information identifying a correct recipient of the electronic file; an encoding section that encodes the extracted electronic file; and a management information transmitting section that transmits, to a pass phrase management apparatus that transmits to a second communication terminal a pass phrase needed to decode the encoded electronic file, first file identification information identifying the encoded electronic file, the pass phrase, and the recipient identification information.

10 Claims, 12 Drawing Sheets

(51) Int. Cl.
*H04L 12/58* (2006.01)
*H04L 29/06* (2006.01)

(52) U.S. Cl.
CPC .......... *H04L 51/08* (2013.01); *H04L 63/0428* (2013.01); *H04L 63/0471* (2013.01)

(58) Field of Classification Search
CPC ....... H04L 51/00; H04L 51/14; H04L 51/066; H04L 51/08; H04L 51/24; G06F 21/60; G06F 21/606; G06F 21/602; G06F 21/6209; G06F 2221/2107
See application file for complete search history.

(56) References Cited

U.S. PATENT DOCUMENTS

| | | | | |
|---|---|---|---|---|
| 2004/0030918 | A1* | 2/2004 | Karamchedu | G06F 21/606 726/3 |
| 2004/0268137 | A1* | 12/2004 | Kouznetsov | G06F 21/10 713/193 |
| 2005/0257057 | A1* | 11/2005 | Ivanov | G06Q 20/383 713/171 |
| 2007/0005713 | A1* | 1/2007 | LeVasseur | H04L 63/126 709/206 |
| 2009/0016538 | A1* | 1/2009 | Drudis | H04M 15/00 380/279 |
| 2009/0177751 | A1* | 7/2009 | Ito | G06Q 10/107 709/206 |
| 2013/0194301 | A1* | 8/2013 | Robbins | G06F 21/60 345/629 |
| 2013/0275762 | A1* | 10/2013 | Tomkow | H04L 51/30 713/176 |
| 2018/0054414 | A1* | 2/2018 | LeVasseur | G06F 21/445 |

FOREIGN PATENT DOCUMENTS

| | | |
|---|---|---|
| JP | 2008-219849 A | 9/2008 |
| JP | 2010-154419 A | 7/2010 |
| JP | 2011-087134 A | 4/2011 |
| JP | 2012-133427 A | 7/2012 |
| JP | 2012-164116 A | 8/2012 |

OTHER PUBLICATIONS

Office Action issued for counterpart Japanese Application 2012-221826, issued by the Japanese Patent Office dated Feb. 3, 2015.
Office Action issued for counterpart Japanese Application 2012-221826, issued by the Japan Patent Office dated Sep. 8, 2015.

* cited by examiner

SYSTEM, A METHOD AND A COMPUTER READABLE MEDIUM FOR TRANSMITTING AN ELECTRONIC FILE

The contents of the following Japanese patent application are incorporated herein by reference: No. 2012-221826 filed on Oct. 4, 2012

BACKGROUND

1. Technical Field

The present invention relates to an electronic file transmission system, a computer readable medium, and an electronic file transmission method.

2. Related Art

A method is known for transmitting an electronic file safely and easily by using a management server that manages decoding passwords necessary for decoding an encoded electronic file, such as shown in Patent Document 1, for example.
Patent Document 1: Japanese Patent Application Publication No. 2010-154419

With a conventional electronic file transmission method, the file to be encoded is determined by a designation from the user.

SUMMARY

Therefore, it is an object of an aspect of the innovations herein to provide an electronic file transmission system, a computer readable medium, and an electronic file transmission method, which are capable of overcoming the above drawbacks accompanying the related art. The above and other objects can be achieved by combinations described in the claims. According to a first aspect of the present invention, provided is an electronic file transmission system comprising a data acquiring section that acquires data including an electronic file that is created or attached by a first communication terminal; an extracting section that extracts from the data the electronic file and recipient identification information identifying a correct recipient of the electronic file; an encoding section that encodes the extracted electronic file; and a management information transmitting section that transmits, to a pass phrase management apparatus that transmits to a second communication terminal a pass phrase needed to decode the encoded electronic file, first file identification information identifying the encoded electronic file, the pass phrase, and the recipient identification information.

According to a second aspect of the present invention, provided is a program causing a computer to function as the electronic file transmission system described above.

According to a third aspect of the present invention, provided is an electronic file transmission method comprising acquiring data including an electronic file that is created or attached by a first communication terminal; extracting from the data the electronic file and recipient identification information identifying a correct recipient of the electronic file; encoding the extracted electronic file; and transmitting, to a pass phrase management apparatus that transmits to a second communication terminal a pass phrase needed to decode the encoded electronic file, first file identification information identifying the encoded electronic file, the pass phrase, and the recipient identification information.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
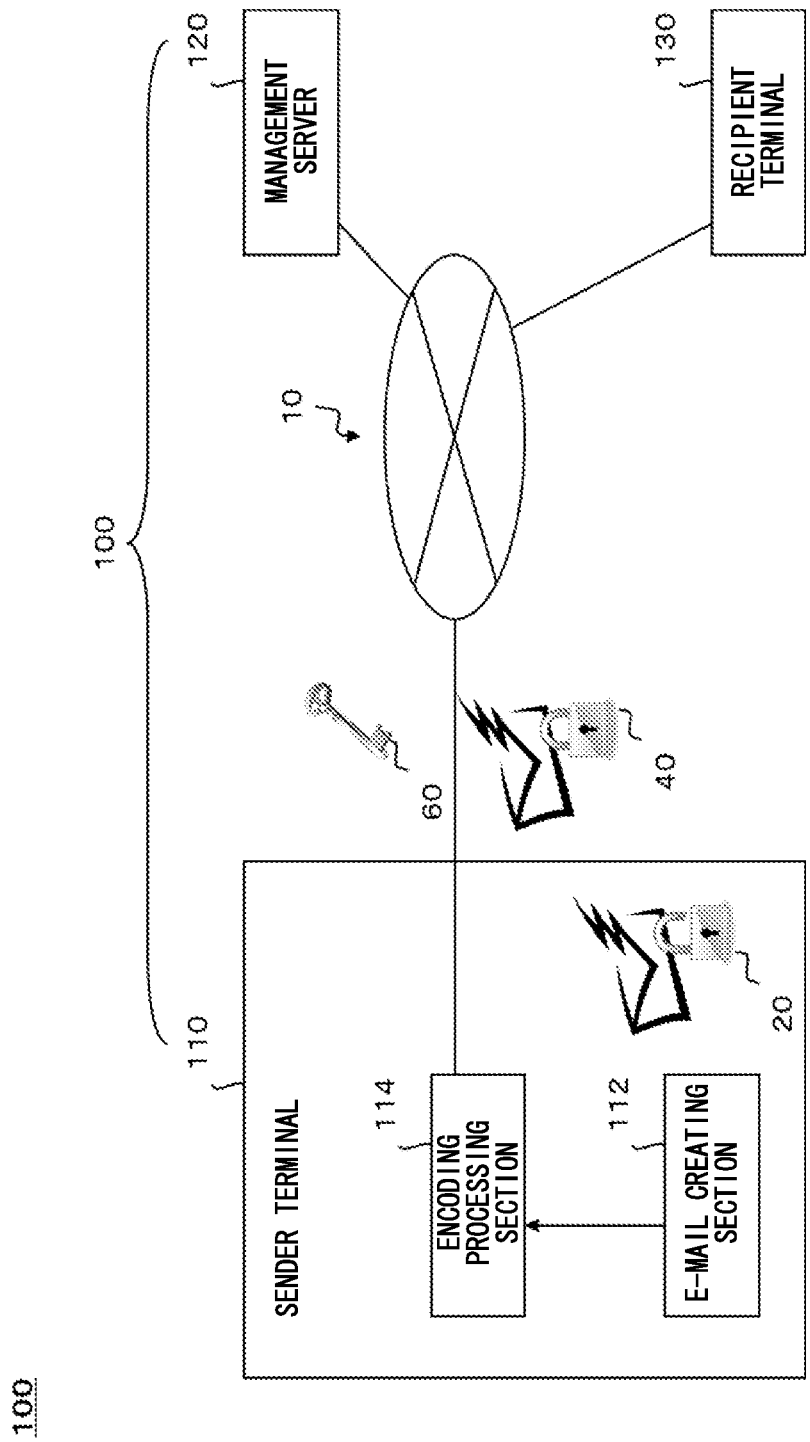
FIG. 1 is a schematic view of an exemplary mail transmission system 100.

FIG. 1 shows an exemplary mail transmission system 100 along with a communication network 10 and a recipient terminal 130. The mail transmission system 100 includes a sender terminal 110 and a management server 120. The sender terminal 110 includes an e-mail creating section 112 and an encoding processing section 114. The present embodiment describes an example of a mail transmission system 100 in which the communication network 10 includes the Internet, and the sender terminal 110, the management server 120, and the recipient terminal 130 send and receive information via the communication network 10.

The mail transmission system 100, the sender terminal 110, and the encoding processing section 114 are examples of an electronic file transmission system. The sender terminal 110 is an example of a first communication terminal. The management server 120 is an example of a pass phrase management apparatus. The recipient terminal 130 is an example of a second communication terminal.

With the present embodiment, a user of the sender terminal 110 may attach an electronic file 20 created at the sender terminal 110 to an electronic mail (referred to hereinafter as "e-mail") with the sender terminal 110 as a transmission source and the recipient terminal 130 as a destination, and send this e-mail. However, before being sent to the recipient terminal 130, the electronic file 20 is extracted from the e-mail by the encoding processing section 114, and an encoded file 40 obtained by encoding the electronic file 20 is attached to the e-mail in place of the electronic file 20. As a result, the sender terminal 110 transmits to the recipient terminal 130 an e-mail to which the encoded file 40 is attached.

The sender terminal 110 transmits to the management server 120 a pass phrase 60 for decoding the encoded file 40. Upon receiving the pass phrase 60 or the like, the management server 120 transmits to the recipient terminal 130 notification information indicating that the encoded file 40 has been transmitted to the recipient terminal 130. The user of the recipient terminal 130 can decode the encoded file 40 by accessing the management server 120 to acquire the pass phrase 60. The management server 120 determines whether the user of the recipient terminal 130 is the correct person to receive the electronic file 20, and determines whether to transmit the pass phrase 60 to the recipient terminal 130.

With the present embodiment, the electronic file 20 attached to the e-mail is automatically encoded according to a predetermined setting. Therefore, every time an electronic file 20 is sent, there is no need to take the time and effort to encode the electronic file 20. Furthermore, cases of transmitting unencoded electronic files 20 can be prevented. Furthermore, by managing the conditions for determining whether transmission of the pass phrase 60 by the management server 120 via the communication network 10 is possible, the security of the encoded file 40 can be managed even after the sender terminal 110 has sent the e-mail.

The following describes the mail transmission system 100 and the components of the mail transmission system 100 in detail. The mail transmission system 100 provides a service of transmitting an electronic file to the sender terminal 110 and the recipient terminal 130. The mail transmission system 100 encodes the electronic file 20 to create the encoded file 40. The mail transmission system 100 transmits the created encoded file 40 to the recipient terminal 130 via the communication network 10. The mail transmission system 100 transmits the pass phrase 60 necessary for decoding the encoded file 40 to the recipient terminal 130 via the communication network 10.

The communication network 10 may be a transmission path for wired communication, a communication path for wireless transmission, or both. The communication network 10 may be the Internet, a dedicated line, a wireless packet communication network, or a combination thereof.

The electronic file 20 may be an electronic file created at the sender terminal 110, or may be an electronic file created at an information processing apparatus other than the sender terminal 110 and stored in the sender terminal 110. The electronic file 20 may be a file that is already encoded, or may be a file that is not encoded. The information processing apparatus used to create the electronic file 20 is an example of a first communication terminal.

The encoded file 40 may use the pass phrase 60 to perform the encoding. The pass phrase 60 is necessary to decode the encoded file 40. The pass phrase 60 may be designated by a user of the sender terminal 110, generated by the encoding processing section 114 according to predetermined rules, or generated randomly by the encoding processing section 114. The pass phrase can also be referred to as a password.

The sender terminal 110 is communicably connected to the management server 120 and the recipient terminal 130, via the communication network 10. The sender terminal 110 need only be an apparatus that can send and receive information via the communication network 10, and may be a wireless terminal, mobile terminal (including a PDA, tablet, notebook computer, and laptop computer), mobile phone, or personal computer with a web browser installed thereon.

The sender terminal 110 may be realized by the activation of software defining the operation of each component of the sender terminal 110 by an information processing apparatus having a normal configuration including a data processing apparatus having a CPU, ROM, RAM, communication interface, and the like, an input apparatus such as a keyboard, touch panel, or microphone, an output apparatus such as a display apparatus, speaker, or vibrating apparatus, and a storage apparatus such as a memory or HDD. The sender terminal 110 may be realized by a virtual server or cloud system. The functions of the management server 120 may be realized by a plurality of servers.

The e-mail creating section 112 creates an e-mail with the electronic file 20 attached thereto and having the recipient terminal 130 as the destination. The e-mail creating section 112 transmits the created e-mail to the encoding processing section 114. The e-mail with the attached electronic file 20 is an example of data including an electronic file.

The e-mail creating section 112 may create an e-mail that includes recipient identification information that identifies the correct recipient of the electronic file 20. The recipient identification information may be a mail address indicating the destination of the e-mail, may be attached to the e-mail along with the electronic file 20 as another electronic file, or may be written in the header of the e-mail.

The recipient identification information may be limitation information that is associated to each correct recipient identified therein and that relates to an operation allowed for or prohibited for these correct recipients. The operation allowed for or prohibited for the correct recipients may be viewing, printing, editing, or screen capturing of the electronic file 20, copying of the electronic file 20 itself, or copying the content of the electronic file 20 to the clipboard, for example. For example, Japanese Patent Application Publication No. 2010-154419 describes prohibiting an operation based on limitation information by using a program operating on the recipient terminal 130.

The encoding processing section 114 acquires from the e-mail creating section 112 the e-mail including the electronic file 20. The encoding processing section 114 extracts the electronic file 20 from the acquired e-mail. The encoding processing section 114 acquires the recipient identification information that identifies the correct recipient of the electronic file 20. The encoding processing section 114 may prompt the user of the sender terminal 110 to input the recipient identification information. The encoding processing section 114 may extract the recipient identification information from the acquired e-mail. The encoding processing section 114 extracts the mail address indicating the destination of the acquired e-mail from the e-mail creating section 112, as the recipient identification information.

The encoding processing section 114 encodes the electronic file 20 to generate the encoded file 40. The encoding processing section 114 may generate transmission file identification information that identifies the encoded file 40 to be transmitted. The transmission file identification information may be created according to predetermined rules, or may be created randomly. The transmission file identification information is an example of first file identification information.

The transmission file identification information may be the file name of the encoded file 40. The file name of the encoded file 40 may be the same as the file name of the electronic file 20, or may be generated according to predetermined rules based on the file name of the electronic file 20. For example, the file name of the encoded file 40 may be generated according to a rule that the extension included in the file name of the electronic file 20 be changed to an extension indicating that the electronic file 20 is encoded.

The encoding processing section 114 transmits to the management server 120 management information for managing the encoded file 40. For example, the encoding processing section 114 may transmit the transmission file identification information, the pass phrase 60 needed to decode the encoded file 40, and the recipient identification information of the electronic file 20. As another example, the management information may be the mail address of the sender of the e-mail, the file name of the electronic file 20, or information indicating the need to transmit notification information described below.

The encoding processing section 114 may transmit the pass phrase 60 to the management server 120 after encoding the pass phrase 60, in the same manner as in the method disclosed in Japanese Patent Application Publication No. 2010-154419. Similarly, the encoding processing section 114 may encode the transmission file identification and the electronic file 20 recipient identification information, and then transmit this information to the management server 120.

The encoding processing section 114 transmits the encoded file 40 to the recipient terminal 130. The encoding processing section 114 may transmit the transmission file identification information along with the encoded file 40. The encoding processing section 114 may delete the electronic file 20 from the acquired e-mail, and create the e-mail anew with the encoded file 40 attached thereto, in place of the electronic file 20. The encoding processing section 114 may transmit the newly created e-mail to the recipient terminal 130.

Before transmitting the management information, e.g. the transmission file identification information, the pass phrase 60, and the electronic file 20 recipient identification information, to the management server 120, the encoding processing section 114 may transmit the encoded file 40 to the recipient terminal 130. Instead, the encoding processing section 114 may transmit the management information to the management server 120, and then transmit the encoded file 40 to the recipient terminal 130.

The encoding processing section 114 may transmit the management information to the management server 120 at predetermined intervals, every time a predetermined capacity is reached, or every time a predetermined number of files is reached. In this way, the information processing efficiency of the encoding processing section 114 and the management server 120 is increased. When the load on the database of the management server 120 is greater than a predetermined value, the encoding processing section 114 may suspend transmission of the management information to the management server 120 until the load has dropped below the predetermined value.

The management server 120 is communicably connected to the sender terminal 110 and the recipient terminal 130 via the communication network 10. The management server 120 may be connected to one or more sender terminals 110 and one or more recipient terminals 130, via the network 10. The management server 120 need only be an apparatus that can send and receive information via the communication network 10, and may be a wireless terminal, mobile terminal (including a PDA, tablet, notebook computer, and laptop computer), mobile phone, or personal computer with a web browser installed thereon.

The management server 120 may be realized by the activation of software defining the operation of each component of the management server 120 by an information processing apparatus having a normal configuration including a data processing apparatus having a CPU, ROM, RAM, communication interface, and the like, an input apparatus such as a keyboard, touch panel, or microphone, an output apparatus such as a display apparatus, speaker, or vibrating apparatus, and a storage apparatus such as a memory or HDD. The management server 120 may be realized by a virtual server or cloud system. The functions of the management server 120 may be realized by a plurality of servers.

The management server 120 acquires the management information from the encoding processing section 114, via the communication network 10. The management server 120 may store the management information. When the management information is received from the encoding processing section 114, the management server 120 may transmit to the recipient terminal 130 the notification information indicating that the encoded file 40 has been transmitted to the recipient terminal 130. The management server 120 may transmit notification information indicating that it is possible for the encoded file 40 to be transmitted to the recipient terminal 130.

The notification information may be transmitted to the recipient terminal 130 along with the main body of the e-mail, or may be added to the main body of the e-mail and transmitted to the recipient terminal 130. The notification information may include a URL or URI, e.g. the URL of the management server 120, indicating the storage location of the pass phrase 60. The notification information may include information needed for user registration if the recipient indicated by the recipient identification information is not user-registered as a user of the service provided by the mail transmission system 100.

The management server 120 acquires from the recipient terminal 130 reception file identification information that identifies the electronic file received by the user of the recipient terminal 130, via the communication network 10. The reception file identification information is an example of second file identification information.

The management server 120 acquires from the recipient terminal 130 user identification information that identifies the user of the recipient terminal 130. The user identification information may be a mail address or SNS (social networking service) at which the user of the recipient terminal 130 can receive the electronic file 20 or the encoded file 40, an account of a file transfer service, a file exchanging service, a file sharing service, an online storage service, or a file hosting service, or a URL or URI of a storage apparatus in which the user of the recipient terminal 130 can store the electronic file 20 or the encoded file 40.

The management server 120 transmits the pass phrase 60 to the recipient terminal 130 in response to a request from the recipient terminal 130. Upon acquiring a request from the recipient terminal 130, before transmitting the pass phrase 60 to the recipient terminal 130, the management server 120 determines whether the user of the recipient terminal 130 is the correct recipient of the electronic file 20. If the management server 120 determines that the user of the recipient terminal 130 is the correct recipient of the electronic file 20, the management server 120 transmits the pass phrase 60 for decoding the encoded file 40 to the recipient terminal 130.

The recipient terminal 130 is communicably connected to the sender terminal 110 and the management server 120 via the communication network 10. The recipient terminal 130 need only be an apparatus that can send and receive information via the communication network 10, and may be a wireless terminal, mobile terminal (including a PDA, tablet, notebook computer, and laptop computer), mobile phone, or personal computer with a web browser installed thereon.

The recipient terminal 130 may be realized by the activation of software defining the operation of each component of the recipient terminal 130 by an information processing apparatus having a normal configuration including a data processing apparatus having a CPU, ROM, RAM, communication interface, and the like, an input apparatus such as a keyboard, touch panel, or microphone, an output apparatus such as a display apparatus, speaker, or vibrating apparatus, and a storage apparatus such as a memory or HDD. The recipient terminal 130 may be realized by a virtual server or cloud system. The functions of the recipient terminal 130 may be realized by a plurality of servers.

The recipient terminal 130 receives the encoded file 40 from the encoding processing section 114 via the communication network 10. The recipient terminal 130 acquires the reception file identification information that indicates the received encoded file 40. The reception file identification information may be the file name of the encoded file 40. The recipient terminal 130 may acquire the reception file identification information according to predetermined rules, based on the file name of the encoded file 40.

If the transmission file identification information is included in the e-mail from the encoding processing section 114, the transmission file identification information may be acquired as the reception file identification information. The recipient terminal 130 may prompt the user of the recipient terminal 130 to input information identifying the encoded file 40 received by the user of the recipient terminal 130. In this way, even when the user of the recipient terminal 130 receives the encoded file 40 at an information processing apparatus other than the recipient terminal 130, the reception file identification information of the encoded file 40 can be acquired.

The recipient terminal 130 transmits to the management server 120 the reception file identification information and the user identification information that identifies the user of the recipient terminal 130, and requests transmission of the pass phrase 60 needed to decode the encoded file 40. Upon receiving the pass phrase 60 from the management server 120, the recipient terminal 130 decodes the encoded file 40 using the pass phrase 60.

The present embodiment describes an example in which the encoding processing section 114 is provided in the sender terminal 110. However, the arrangement of the encoding processing section 114 is not limited to this. The encoding processing section 114 may be arranged anywhere in the transmission path between the sender terminal 110 and the recipient terminal 130. Someone skilled in the art can change the transmission destination of the e-mail, the encoded file 40, the notification information, and the pass phrase 60 as needed, according to the arrangement of the sender terminal 110, the encoding processing section 114, and the recipient terminal 130.

Furthermore, the present embodiment describes an example in which the mail transmission system 100 transmits the encoded file 40 with the recipient terminal 130 as the destination and transmits the pass phrase 60 with the recipient terminal 130 as the destination. However, the electronic file transmission method is not limited to this.

As another embodiment, the mail transmission system 100 transmits the encoded file 40 with an information processing apparatus outside of the recipient terminal 130 as the destination. The notification information transmitted to the recipient terminal 130 includes the URL or URI of the storage location of the encoded file 40 in addition to the URL or URI indicating the storage location of the pass phrase 60.

With this embodiment, the user of the recipient terminal 130 accesses the information processing apparatus shown by the URL or URI indicating the storage location of the encoded file 40 and requests the encoded file 40 to be transmitted. Furthermore, the user of the recipient terminal 130 accesses the management server 120 and requests transmission of the pass phrase 60. The management server 120 determines whether the user of the recipient terminal 130 is the correct recipient of the electronic file 20, and if the user is determined to be the correct recipient, transmits the pass phrase 60 to the recipient terminal 130. In this way, the user of the recipient terminal 130 can decode the encoded file 40 to acquire the electronic file 20.

In the other embodiment described above, the information processing apparatus that receives the encoded file 40 from the mail transmission system 100 may request the pass phrase for transmitting the encoded file 40 when a request for transmission of the encoded file 40 is received from the recipient terminal 130. The pass phrase for transmitting the encoded file 40 may be included in the notification information.

Figure 2:
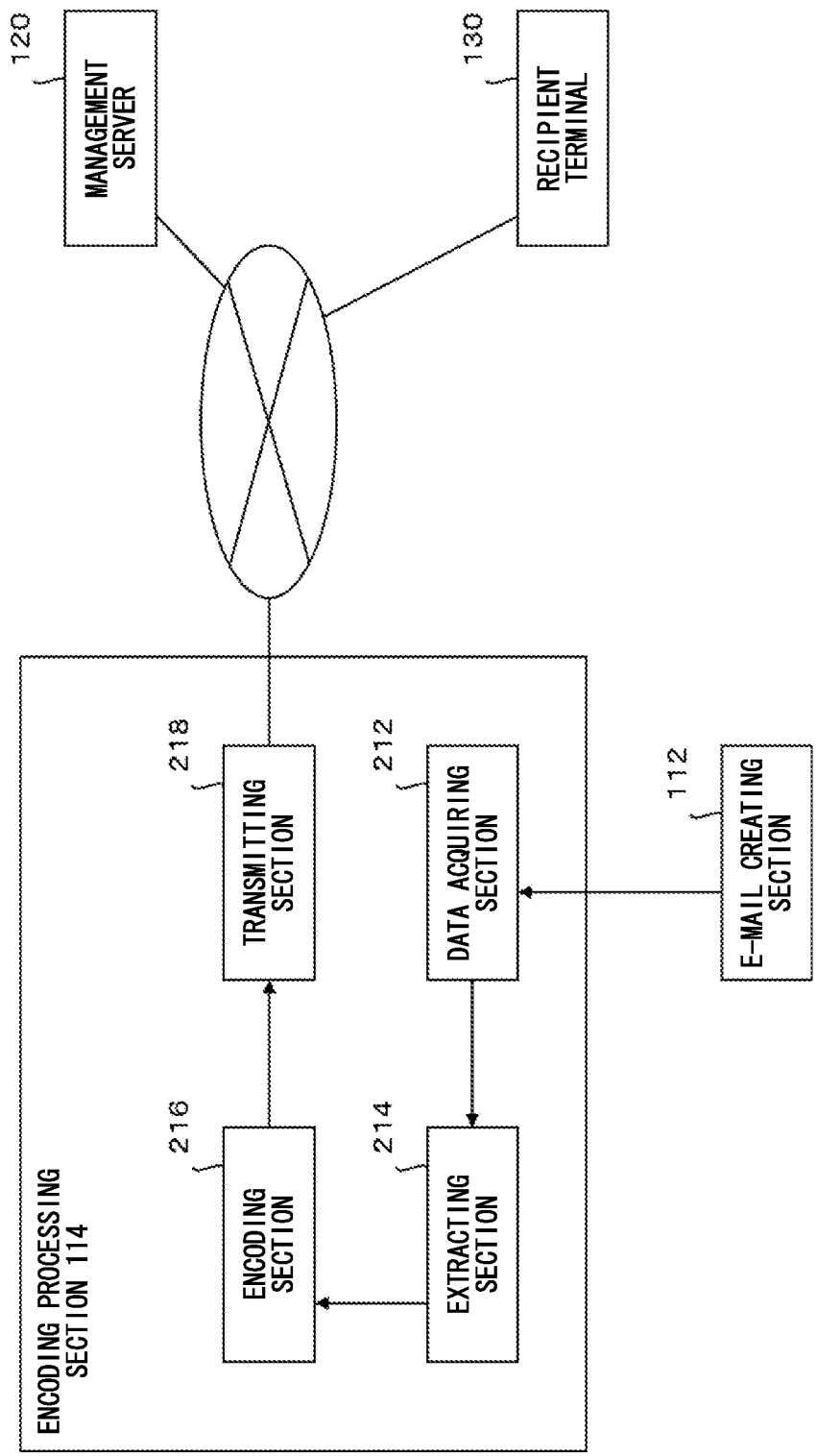
FIG. 2 is a schematic view of an exemplary encoding processing section 114.

FIG. 2 shows an exemplary encoding processing section 114 along with the communication network 10, the e-mail creating section 112, the management server 120, and the recipient terminal 130. The encoding processing section 114 includes a data acquiring section 212, an extracting section 214, an encoding section 216, and a transmitting section 218. The transmitting section 218 is an example of a management information transmitting section or an electronic file transmitting section.

The data acquiring section 212 acquires the e-mail including the electronic file 20 from the e-mail creating section 112. The data acquiring section 212 transmits the acquired e-mail to the extracting section 214. The data acquiring section 212 may be an interface for acquiring data from a module outside the encoding processing section 114.

The extracting section 214 extracts the electronic file 20 from the e-mail acquired by the data acquiring section 212. The extracting section 214 extracts, from the e-mail acquired by the data acquiring section 212, the recipient identification information that indicates the correct recipient of the electronic file 20. The extracting section 214 may extract the recipient identification information from the header of the e-mail, or may extract the recipient identification information from an electronic file attached to the e-mail. The extracting section 214 transmits the extracted electronic file 20 to the encoding section 216. The extracting section 214 may transmit the header and main body of the e-mail to the transmitting section 218.

The encoding section 216 generates the encoded file 40 by encoding the electronic file 20 extracted by the extracting section 214. The encoding section 216 may generate the pass phrase 60 needed to decode the encoded file 40. The encoding section 216 may generate the transmission file identification information for identifying the generated encoded file 40.

The transmitting section 218 transmits to the management server 120 the transmission file identification information, the pass phrase 60 needed to decode the encoded file 40, and the electronic file 20 recipient identification information. The transmitting section 218 transmits the encoded file 40 to the recipient terminal 130. The transmitting section 218 may be an interface that exchanges information with the management server 120 and the recipient terminal 130, via the communication network 10.

Figure 3:
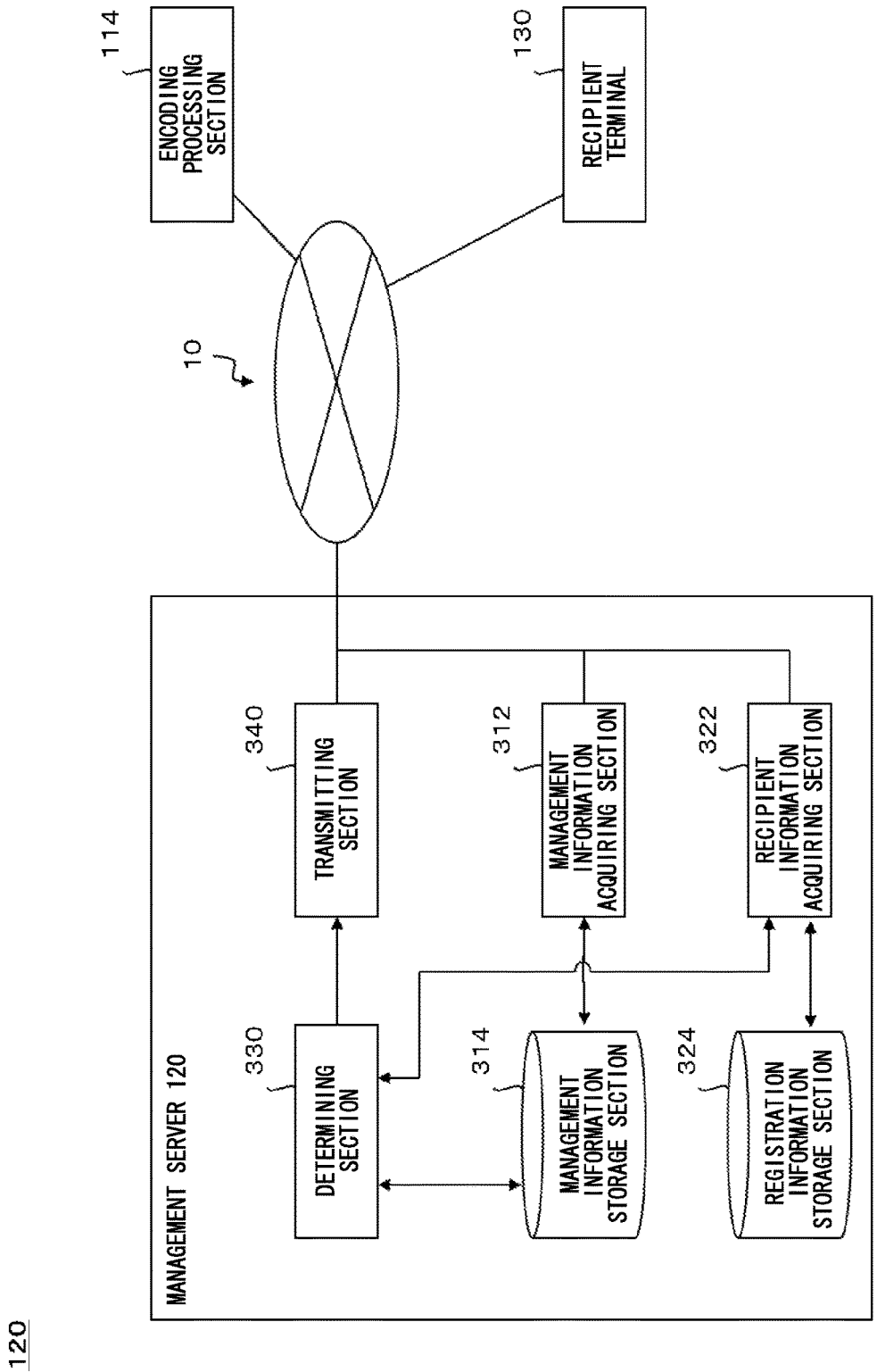
FIG. 3 is a schematic view of an exemplary management server 120.

FIG. 3 shows an exemplary management server 120, along with the communication network 10, the encoding processing section 114, and the recipient terminal 130. The management server 120 includes a management information acquiring section 312, a management information storage section 314, a recipient information acquiring section 322, a registration information storage section 324, a determining section 330, and a transmitting section 340. The transmitting section 340 is an example of a notification information transmitting section or a pass phrase transmitting section.

The management information acquiring section 312 acquires the management information, e.g. the transmission file identification information, the pass phrase 60, and the electronic file 20 recipient identification information, from the encoding processing section 114. The management information acquiring section 312 stores the management information acquired from the encoding processing section 114 in the management information storage section 314. The management information acquiring section 312 may be an interface that exchanges information with the encoding processing section 114 via the communication network 10.

The management information acquiring section 312 may request to change the recipient identification information from the encoding processing section 114. This recipient identification information change request may be a request to add or delete correct recipients of the electronic file 20 or a request to change the limitation information relating to at least a portion of the correct recipients of the electronic file 20, for example. In this way, the user of the sender terminal 110 can change the correct recipients of the electronic file 20 and change the operations that are allowed or prohibited for the correct recipients of the electronic file 20, even after the e-mail including the electronic file 20 has been sent.

The management information storage section 314 stores the management information. The management information storage section 314 may store the transmission file identification information, the pass phrase 60, and the electronic file 20 recipient identification information in association with each other. The management information storage section 314 may be a storage apparatus or storage medium, such as a hard disk or memory.

The recipient information acquiring section 322 receives a request to transmit the pass phrase 60 needed to decode the encoded file 40, from the recipient terminal 130. The recipient information acquiring section 322 acquires the reception file identification information that identifies the encoded file 40 received by the user of the recipient terminal 130, from the recipient terminal 130. The recipient information acquiring section 322 acquires the user identification information that identifies the user of the recipient terminal 130, from the recipient terminal 130. If the user of the recipient terminal 130 is not user-registered as a user of the service provided by the mail transmission system 100, the recipient information acquiring section 322 may acquire the information needed for user registration from the recipient terminal 130.

The recipient information acquiring section 322 transmits to the determining section 330 the reception file identification information and the user identification information. The recipient information acquiring section 322 stores the information needed for user registration that has been acquired from the management information acquiring section 312 in the registration information storage section 324. The recipient information acquiring section 322 may be an interface that exchanges information with the recipient terminal 130 via the communication network 10.

The registration information storage section 324 stores at least the user identification information. The registration information storage section 324 may store each of one or more pieces of user identification information in association with information indicating whether there is user registration for the service provided by the mail transmission system 100. The registration information storage section 324 may store the recipient identification information in association with the user identification information, when the user registration is performed. The registration information storage section 324 may store one piece of recipient identification information in association with a plurality of pieces of user identification information. The registration information storage section 324 may be a storage apparatus or storage medium, such as a hard disk or memory.

The determining section 330 acquires the user identification information and the reception file identification information from the recipient information acquiring section 322. The determining section 330 determines whether the user of the recipient terminal 130 is the correct recipient of the electronic file 20, based on the recipient identification information and the transmission file identification information stored in the management information storage section 314 and the user identification information and reception file identification information acquired from the recipient information acquiring section 322.

For example, the determining section 330 first extracts, from the transmission file identification information stored in the management information storage section 314, the transmission file identification information that matches or corresponds to the reception file identification information. Next, the determining section 330 determines whether recipient identification information that matches or corresponds to the user identification information is present in the recipient identification information stored in the management information storage section 314 in association with the extracted transmission file identification information. If recipient identification information that matches or corresponds to the user identification information is present in the recipient identification information, the determining section 330 determines that the user of the recipient terminal 130 is the correct recipient of the electronic file 20. In the above description, referring to A and B as "corresponding" means that A can be made identical to B by undergoing processing according to predetermined rules.

If it is determined that the user of the recipient terminal 130 is the correct recipient of the electronic file 20, the determining section 330 extracts the pass phrase 60 stored in the management information storage section 314 in association with the transmission file identification information that matches or corresponds to the reception file identification information. The determining section 330 transmits the extracted pass phrase 60 to the transmitting section 340.

If the management information acquiring section 312 receives at least one of the transmission file identification information, the pass phrase 60, and the electronic file 20 recipient identification information from the encoding processing section 114, the transmitting section 340 may transmit the notification information to the recipient terminal 130. If the determining section 330 determines that the user of the recipient terminal 130 is the correct recipient of the electronic file 20, the transmitting section 340 transmits the pass phrase 60 extracted by the determining section 330 to the recipient terminal 130. The transmitting section 340 may be an interface that exchanges information with the encoding processing section 114 and the recipient terminal 130 via the communication network 10.

In the above description, the mail transmission system 100 and each component of the mail transmission system 100 may be realized by hardware or software, or by a combination thereof. The mail transmission system 100 and the components of the mail transmission system 100 may each be a system specialized for a certain use or a general information processing apparatus such as a personal computer. These specialized systems and information processing apparatuses may be realized by a single computer, or by a plurality of computers distributed on a network.

Furthermore, a computer can be used to function as the mail transmission system 100 or components of the mail transmission system 100 by executing a program on the computer. This program may be stored on a computer readable storage medium or on a storage apparatus connected to the network. The mail transmission system 100 and components of the mail transmission system 100 may be realized by the activation of software or a program defining the operation of each component of the mail transmission system 100 by an information processing apparatus having a normal configuration including a data processing apparatus having a CPU, ROM, RAM, communication interface, and the like, an input apparatus, an output apparatus, and a storage apparatus.

The programs that are installed on the computer and cause the computer to function as the mail transmission system 100 or a portion of the mail transmission system 100 according to the present embodiment include modules defining the operation of the mail transmission system 100 or each component of the mail transmission system 100. These programs and modules prompt the CPU or the like to make the computer function as the mail transmission system 100 or a portion of the mail transmission system 100. The information processes recorded in these programs are read by the computer to cause the computer to function as a specific means in which the software and hardware described above work together. With these specific means, a unique apparatus suitable for an intended use can be configured to function by realizing the calculations or computations appropriate for the intended use of the computer of the present embodiment.

The functions of the components in the mail transmission system 100 are not strictly divided, and the functions of the components of the mail transmission system 100 are not limited to the embodiment described above. The data acquiring section 212 may realize a portion of the function of the extracting section 214, and the extracting section 214 may realize a portion of the function of the data acquiring section 212. Furthermore, the functions of the encoding section 216 and the transmitting section 218 may be realized by a single module, or the functions of the data acquiring section 212 and the transmitting section 218 may be realized by a single module. The management information storage section 314 and the registration information storage section 324 may be configured as a single database, or as three or more databases.

Figure 4:
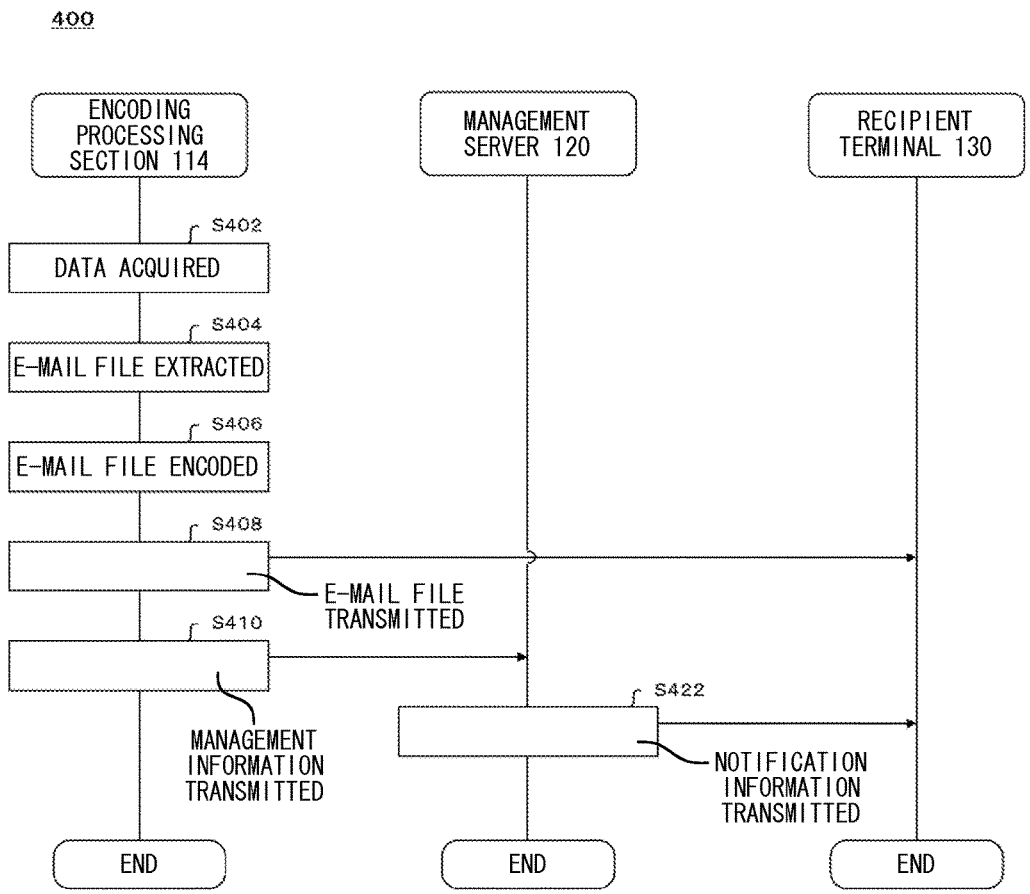
FIG. 4 shows the outline of an exemplary electronic file transmission process 400.

FIG. 4 shows an outline of an exemplary electronic file transmission process 400 performed by the mail transmission system 100. With the transmission process 400, at S402, the encoding processing section 114 acquires an e-mail that includes the electronic file 20 from the e-mail creating section 112. At S404, the encoding processing section 114 extracts from the acquired e-mail the electronic file 20 and the recipient identification information that identifies the correct recipient of the electronic file 20.

At S406, the encoding processing section 114 encodes the electronic file 20 and generates the encoded file 40, the pass phrase 60 for the encoded file 40, and the transmission file identification information. At S408, the encoding processing section 114 transmits the encoded file 40 to the recipient terminal 130. At S410, the encoding processing section 114 transmits the management information for managing the encoded file 40 to the management server 120, and processing by the encoding processing section 114 ends. The management information may include the transmission file identification information, the pass phrase 60, and the recipient identification information. At S422, the management server 120 transmits the notification information to the recipient terminal 130, and processing by the management server 120 and the recipient terminal 130 then ends.

Figure 5:
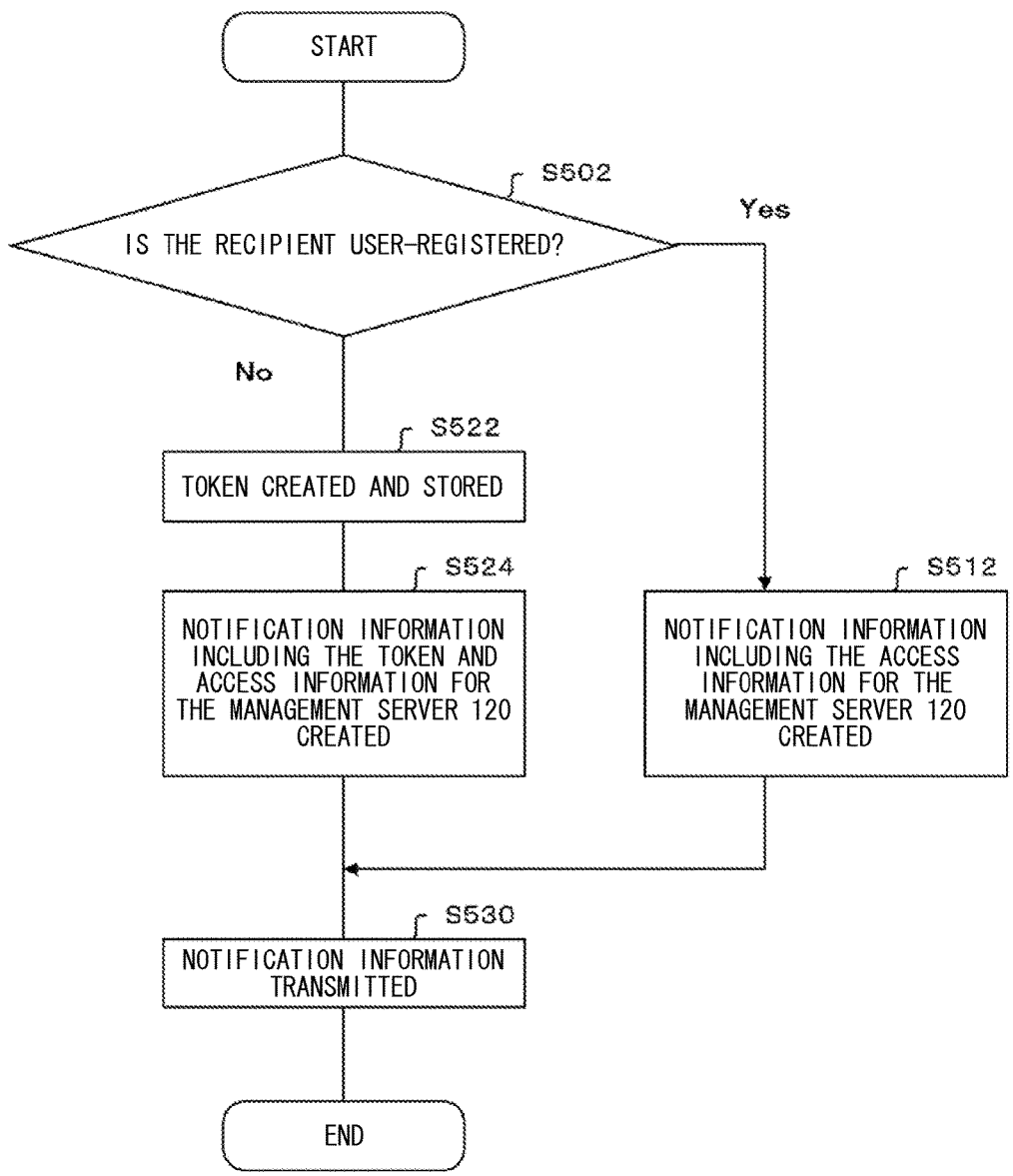
FIG. 5 shows the outline of an exemplary step S422 for transmitting notification information.

FIG. 5 shows an outline of an exemplary notification information transmission process performed at S422. First, at S502, the management server 120 determines whether the recipient identified by the recipient identification information acquired by the management information acquiring section 312 is user-registered as a user of the service provided by the mail transmission system 100.

For example, the determining section 330 may determine whether there is user identification information that matches or corresponds to the recipient identification information within the user identification information stored in the registration information storage section 324. If there is user identification information that matches or corresponds to the recipient identification information within the user identification information, the determining section 330 determines that the recipient identified by the recipient identification information is already user-registered.

If the management server 120 determines that the recipient identified by the recipient identification information is already user-registered (the "Yes" of S502), at S512, the management server 120 creates the notification information that includes access information for the management server 120, e.g. the URL of the management server 120.

If the management server 120 determines that the recipient identified by the recipient identification information is not yet user-registered (the "No" of S502), at S522, the management server 120 generates a data sequence (referred to hereinafter as a "token") formed by random information. The management server 120 may store the recipient identification information acquired by the management information acquiring section 312 in association with the generated token.

The management server 120 can authenticate the user requesting user registration by requesting input of the token during user registration. Furthermore, the management server 120 can associate the user identification information that identifies the user of the recipient terminal 130 requesting the user registration with the recipient identified by the recipient identification information acquired by the management information acquiring section 312.

At S524, the management server 120 creates the notification information that includes the management server 120 access information, e.g. the URL of the management server 120, and the token generated at S522. After this, at S530, the management server 120 transmits the created notification information to the recipient terminal 130 and the process ends.

Figure 6:
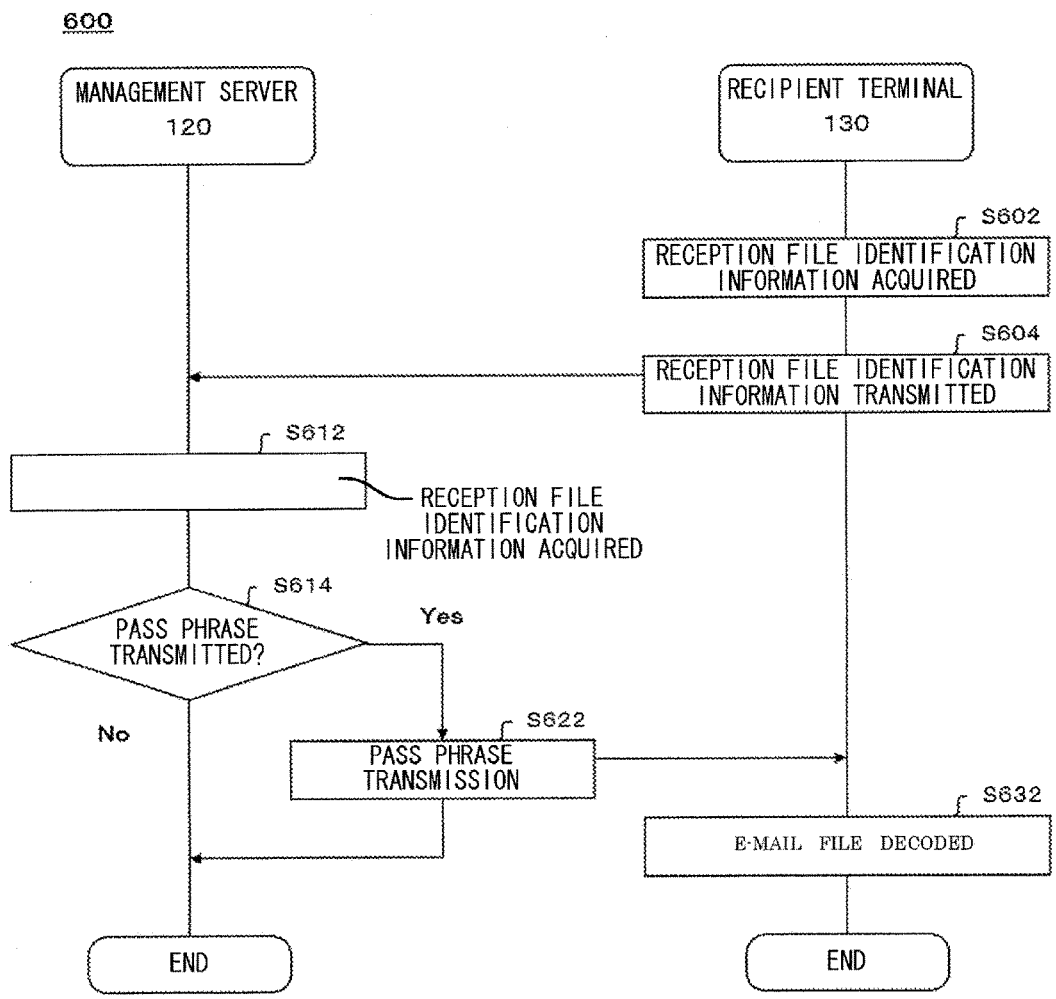
FIG. 6 shows the outline of an exemplary pass phrase transmission process 600.

FIG. 6 shows the outline of a pass phrase 60 transmission process 600 performed by the mail transmission system 100. The present embodiment describes the process of the management server 120 transmitting the pass phrase 60 to the recipient terminal 130 in response to a request from the recipient terminal 130, using an example in which the user of the recipient terminal 130 has completed the user registration and the management server 120 stores the transmission file identification information acquired from the encoding processing section 114 in the management information storage section 314 in association with the electronic file 20 recipient identification information and the pass phrase 60 corresponding to the encoded file 40.

In the present embodiment, at S602, the recipient terminal 130 acquires the reception file identification information that identifies the encoded file 40 received by the user of the recipient terminal 130. At S604, the recipient terminal 130 accesses the management server 120 and requests transmission of the pass phrase for the acquired reception file. At S604, the recipient terminal 130 transmits the reception file identification information acquired at S602 to the management server 120, in association with the user identification information that identifies the user of the recipient terminal 130. At S612, the management server 120 acquires from the recipient terminal 130 the reception file identification information that identifies the encoded file 40 and the user identification information that identifies the user of the recipient terminal 130.

At S614, the management server 120 determines whether it is acceptable to transmit the pass phrase 60 to the recipient terminal 130. For example, the management server 120 may determine whether the user of the recipient terminal 130 is the correct recipient of the electronic file 20 based on the recipient identification information and the transmission file identification information stored in the management information storage section 314 and the user identification information and reception file identification information acquired from the recipient information acquiring section 322.

If the management server 120 determines that the user of the recipient terminal 130 is the correct recipient of the electronic file 20 (the "Yes" of S614), at S622, the management server 120 transmits to the recipient terminal 130 the pass phrase 60 needed to decode the encoded file 40 identified by the transmission file identification information that matches or corresponds to the reception file identification information, and the process is then completed. The recipient terminal 130 decodes the encoded file 40 and the process then ends. If the management server 120 determines that the user of the recipient terminal 130 is not the correct recipient of the electronic file 20 (the "No" of S614), the management server 120 ends the process without transmitting the pass phrase 60 to the recipient terminal 130.

Figure 7:
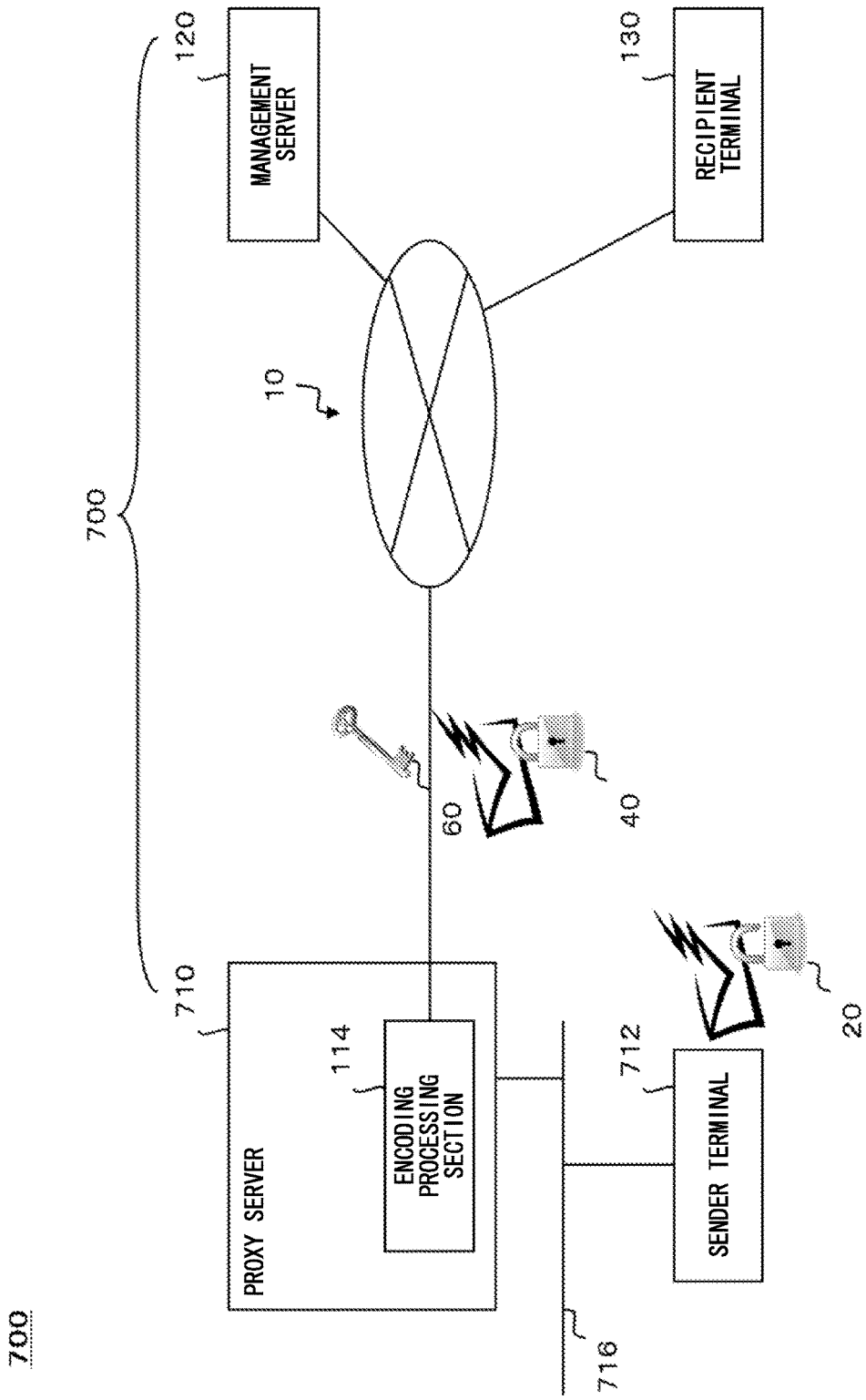
FIG. 7 is a schematic view of an exemplary mail transmission system 700.

FIG. 7 shows an exemplary mail transmission system 700 along with the communication network 10, a sender terminal 712, a LAN 716, and the recipient terminal 130. The mail transmission system 700 includes a proxy server 710 having the encoding processing section 114 and the management server 120. The mail transmission system 700 and the proxy server 710 are an example of an electronic file transmission system. The sender terminal 712 is an example of a first communication terminal.

The mail transmission system 700 differs from the mail transmission system 100 in that the encoding processing section 114 is arranged in the proxy server 710 instead of in the sender terminal 712 and that the sender terminal 712 is connected to the communication network 10 via the proxy server 710. Aside from these configurational differences, the mail transmission system 700 may have the same configuration as the mail transmission system 100. The following description of the present embodiment includes only the differences between the mail transmission system 100 and the mail transmission system 700, and configurations that are identical to those of the mail transmission system 100 or the sender terminal 110 are omitted from the description.

The sender terminal 712 is connected to the proxy server 710 via the LAN 716. The sender terminal 712 is connected to the communication network 10 via the proxy server 710. The sender terminal 712 differs from the sender terminal 110 by not including the encoding processing section 114. Aside from this configurational difference, the sender terminal 712 may have the same configuration as the sender terminal 110.

With the present embodiment, the user of the sender terminal 712 attaches an electronic file 20 created at the sender terminal 712 to an e-mail with the sender terminal 712 as the transmission source and the recipient terminal 130 as the destination, and transmits this e-mail, for example. The e-mail is transmitted to the recipient terminal 130 via the proxy server 710.

However, the electronic file 20 is extracted from the e-mail by the encoding processing section 114 of the proxy server 710 and, instead of the electronic file 20, the encoded file 40 obtained by encoding the electronic file 20 is attached to the e-mail. As a result, the proxy server 710 transmits to the recipient terminal 130 the e-mail with the encoded file 40 attached thereto.

The proxy server 710 transmits to the management server 120 the management information including the pass phrase 60. Upon receiving the management information, the management server 120 transmits to the recipient terminal 130 notification information indicating that the encoded file 40 has been transmitted to the recipient terminal 130. The user of the recipient terminal 130 can decode the encoded file 40 in the same manner as in the mail transmission system 100.

The present embodiment describes an example in which the proxy server 710 and the management server 120 forming the mail transmission system 700 are separate servers. However, the mail transmission system 700 is not limited to this embodiment. The proxy server 710 and the management server 120 may operate on the same server.

Figure 8:
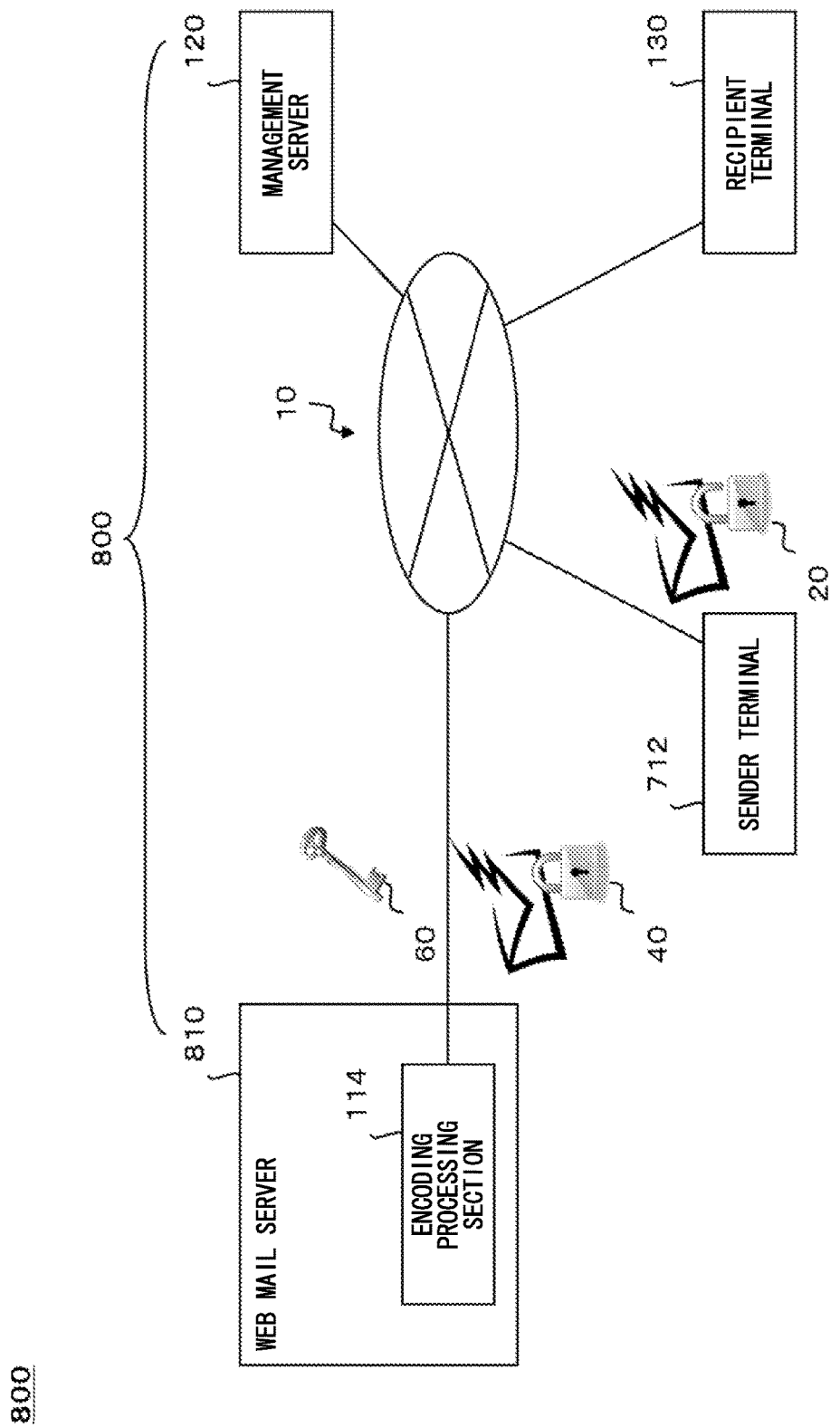
FIG. 8 is a schematic view of an exemplary mail transmission system 800.

FIG. 8 shows an exemplary mail transmission system 800 along with the communication network 10, the sender terminal 712, and the recipient terminal 130. The mail transmission system 800 includes a web mail server 810 having the encoding processing section 114 and the management server 120. The mail transmission system 800 and the web mail server 810 are an example of an electronic file transmission system.

The mail transmission system 800 differs from the mail transmission system 100 and the mail transmission system 700 in that the encoding processing section 114 receives the main body of the e-mail and the electronic file 20 from the sender terminal 712 via the communication network 10, and that the transmission source of the e-mail is the web mail server 810 instead of the sender terminal 712. Aside from these configurational differences, the mail transmission system 800 may have the same configuration as the mail transmission system 100 or the mail transmission system 700.

With the present embodiment, the user of the sender terminal 712 accesses the web mail server 810 through a web browser operating on the sender terminal 712 and begins using the e-mail service provided by the web mail server 810, for example. The user of the sender terminal 712 uploads the electronic file 20 created at the sender terminal 712 to the web mail server 810, attaches the electronic file 20 to the e-mail with the web mail server 810 as the transmission source and the recipient terminal 130 as the destination, and transmits the e-mail.

However, before being transmitted to the recipient terminal 130, the electronic file 20 is extracted from the e-mail by the encoding processing section 114 and, instead of the electronic file 20, the encoded file 40 obtained by encoding the electronic file 20 is attached to the e-mail. As a result, the web mail server 810 transmits to the recipient terminal 130 the e-mail with the encoded file 40 attached thereto.

The web mail server 810 transmits to the management server 120 the management information including the pass phrase 60. The management server 120 transmits to the recipient terminal 130 notification information indicating that the encoded file 40 has been transmitted to the recipient terminal 130. The user of the recipient terminal 130 can decode the encoded file 40 in the same manner as in the mail transmission system 100.

Figure 9:
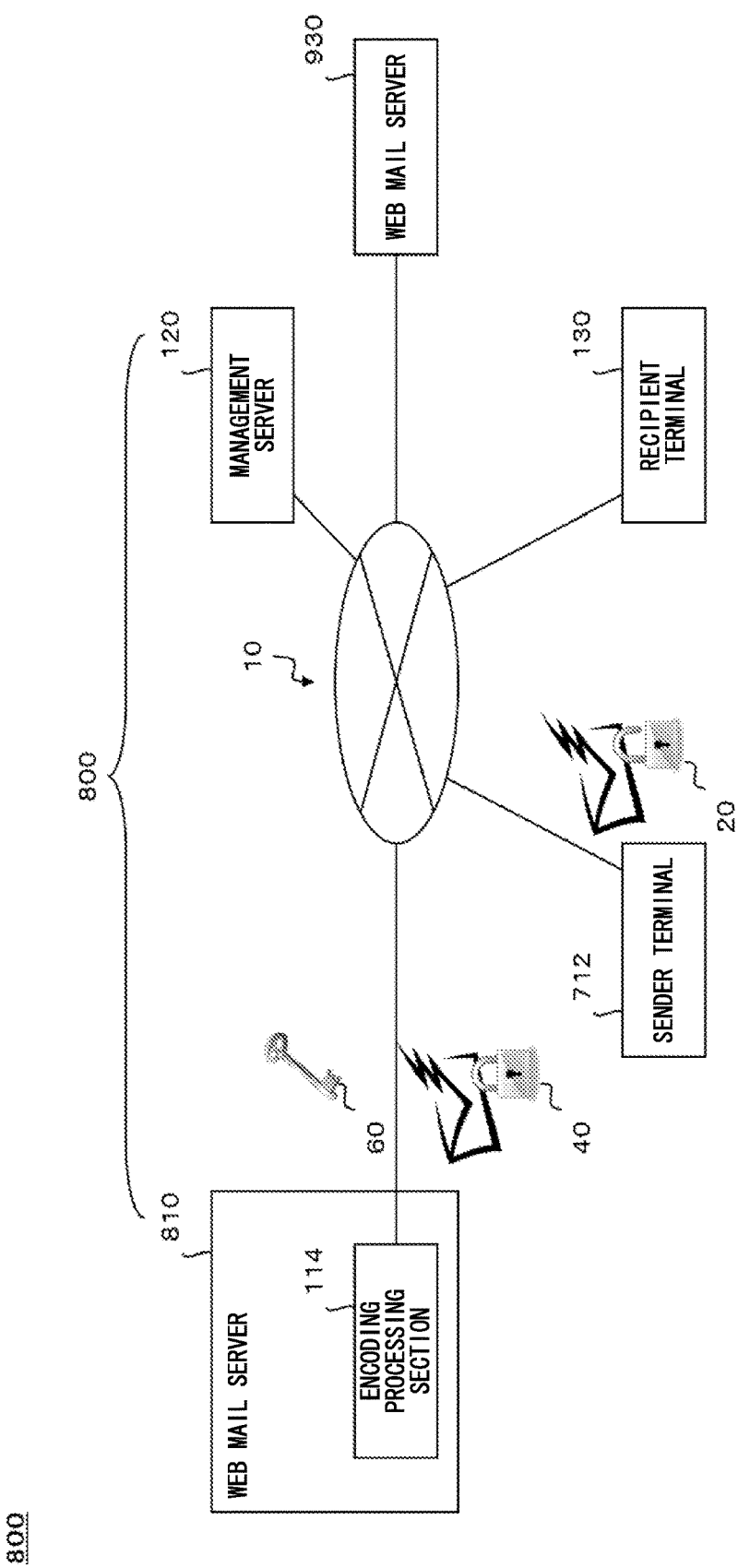
FIG. 9 is a schematic view of another exemplary mail transmission system 800.

FIG. 9 shows another exemplary mail transmission system 800 along with the communication network 10, the sender terminal 712, and the recipient terminal 130. The mail transmission system 800 of the present embodiment differs from the mail transmission system 800 described in relation to FIG. 8 in that the destination of the e-mail is a web mail server 930 instead of the recipient terminal 130. Aside from this configurational difference, the mail transmission system 800 may have the same configuration as the mail transmission system 800 described in relation to FIG. 8. The encoded file 40 received by the web mail server 930 is an example of the electronic file received by the user of the recipient terminal 130.

In the present embodiment, the user of the sender terminal 712 accesses the web mail server 810 through a web browser operating on the sender terminal 712 and begins using the e-mail service provided by the web mail server 810, for example. The user of the sender terminal 712 uploads the electronic file 20 created at the sender terminal 712 to the web mail server 810, attaches the electronic file 20 to the e-mail having the web mail server 810 as the transmission source and the web mail server 930 as the destination, and transmits this e-mail.

However, before being transmitted to the web mail server 930, the electronic file 20 is extracted from the e-mail by the encoding processing section 114 and, instead of the electronic file 20, the encoded file 40 obtained by encoding the electronic file 20 is attached to the e-mail. As a result, the web mail server 810 transmits to the web mail server 930 the e-mail with the encoded file 40 attached thereto.

The web mail server 810 transmits to the management server 120 the management information including the pass phrase 60. The management server 120 transmits to the web mail server 930 notification information indicating that the encoded file 40 has been transmitted to the web mail server 930. If the mail address of the recipient terminal 130 is included along with the mail address of the e-mail service provided by the web mail server 930 in the recipient identification information identifying the correct recipient of the electronic file 20, the management server 120 may transmit the notification information to the recipient terminal 130.

The user of the recipient terminal 130 accesses the web mail server 930 through a web browser operating on the recipient terminal 130, and begins using the e-mail service provided by the web mail server 930. The user of the recipient terminal 130 downloads the encoded file 40 that arrived at the mail address of the user in the e-mail service provided by the web mail server 930, from the web mail server 930 to the recipient terminal 130.

The user of the recipient terminal 130 can decode the encoded file 40 by accessing the management server 120 from the web mail server 930 and acquiring the pass phrase 60. If the mail address of the recipient terminal 130 is included along with the mail address of the e-mail service provided by the web mail server 930 in the recipient identification information identifying the correct recipient of the electronic file 20, the user of the recipient terminal 130 can access the management server 120 from the recipient terminal 130 and acquire the pass phrase 60.

The present embodiment describes an example in which the user of the sender terminal 712 uses the e-mail service provided by the web mail server 810, the user of the recipient terminal 130 uses the e-mail service provided by the web mail server 930, and the e-mail is transmitted from the web mail server 810 to the web mail server 930. However, the e-mail transmission method is not limited to this embodiment. Instead, the user of the sender terminal 712 and the user of the recipient terminal 130 may both use e-mail services provided by web mail servers 810, and transmit the e-mail from one web mail server 810 to another web mail server 810.

Figure 10:
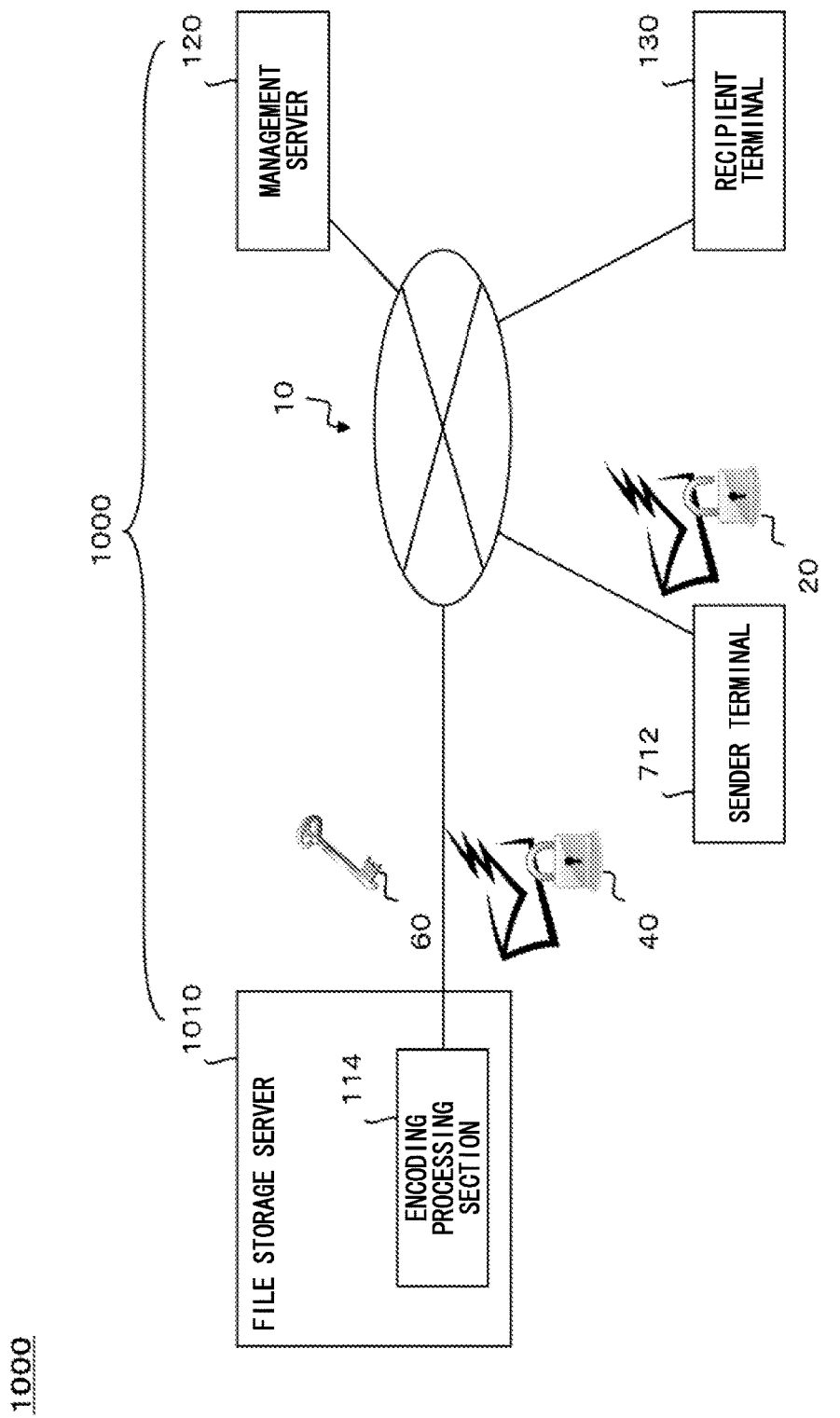
FIG. 10 is a schematic view of an exemplary file transfer system 1000.

FIG. 10 shows an exemplary file transfer system 1000 along with the communication network 10, the sender terminal 712, and the recipient terminal 130. The file transfer system 1000 includes the encoding processing section 114, a file storage server 1010, and the management server 120. The file transfer system 1000 and the file storage server 1010 are an example of an electronic file transmission system.

The file storage server 1010 provides a file transfer service to the sender terminal 712 and the recipient terminal 130. Specifically, the file storage server 1010 receives an upload request that includes an electronic file from the sender terminal 712, and stores the uploaded electronic file. The file storage server 1010 transmits the electronic file to the recipient terminal 130 in response to a download request from the recipient terminal 130. The file transfer service may also be referred to as a file exchanging service, a file sharing service, an online storage service, a file hosting service, or the like.

The file transfer system 1000 differs from the mail transmission system 100, the mail transmission system 700, and the mail transmission system 800 in that the file storage server 1010 provides the file transfer service. In the following description of the file transfer system 1000, description of configurations that are identical to those of the mail transmission system 100, the mail transmission system 700, or the mail transmission system 800 may be omitted.

With the present embodiment, the file storage server 1010 receives an upload request from the sender terminal 712, for example. The upload request includes the electronic file 20 and the mail address of the recipient terminal 130 as information indicating the recipient of the electronic file 20. The upload request is an example of recipient identification information and data including an electronic file. The file storage server 1010 extracts the electronic file 20 from the upload request and, instead of the electronic file 20, stores the encoded file 40 obtained by encoding the electronic file 20.

When the encoded file 40 is stored, the file storage server 1010 notifies the recipient terminal 130 that the encoded file 40 has been uploaded. The user of the recipient terminal 130 accesses the file storage server 1010 from the recipient terminal 130 and downloads the encoded file 40 stored in the file storage server 1010.

The file storage server 1010 transmits the management information including the pass phrase 60 to the management server 120. Upon receiving the management information, the management server 120 transmits to the recipient terminal 130 notification information indicating that transmission of the encoded file 40 is possible. The user of the recipient terminal 130 can decode the encoded file 40 by accessing the management server 120 and acquiring from the recipient terminal 130 the pass phrase 60 of the encoded file 40 indicated by the notification information.

The present embodiment describes an example in which the file storage server 1010 encodes the electronic file 20 when the electronic file 20 is stored and, when the encoded file 40 is stored, notifies the recipient terminal 130 that the encoded file 40 has been uploaded. However, the file storage server 1010 is not limited to this embodiment. As another embodiment, the file storage server 1010 may store the electronic file 20 in response to an upload request. The file storage server 1010 may notify the recipient terminal 130 that the electronic file 20 has been uploaded, when the electronic file 20 is stored.

The file storage server 1010 generates the encoded file 40 by encoding the electronic file 20 when a download request for the electronic file 20 is received from the recipient terminal 130. The file storage server 1010 transmits the encoded file 40 to the recipient terminal 130 in response to the download request. The file storage server 1010 transmits the management information including the pass phrase 60 to the management server 120, when the encoded file 40 is generated. Upon receiving the management information, the management server 120 transmits the notification information to the recipient terminal 130. The user of the recipient terminal 130 can decode the encoded file 40 by accessing the management server 120 to acquire from the recipient terminal 130 the pass phrase 60 of the encoded file 40 indicated by the notification information.

Figure 11:
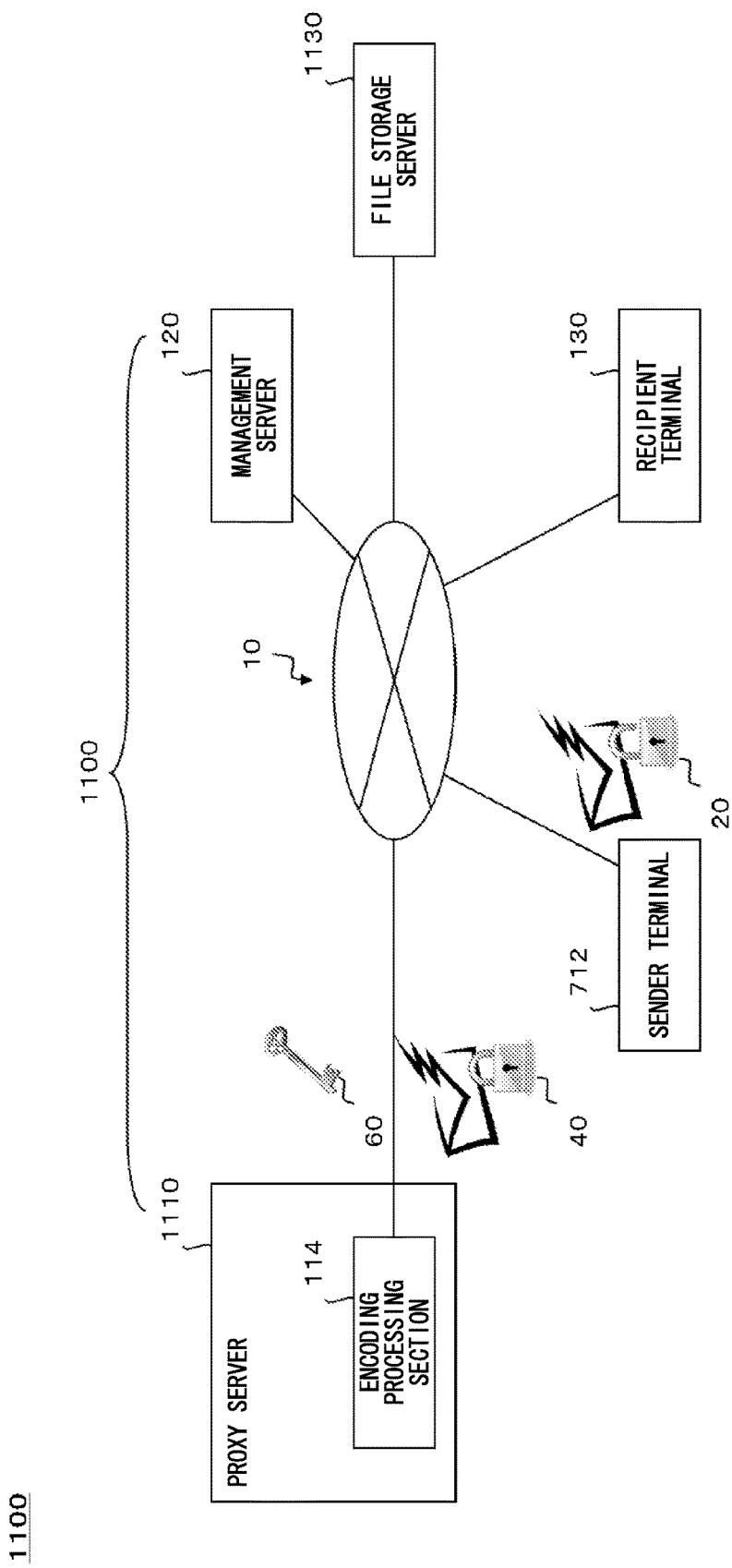
FIG. 11 is a schematic view of an exemplary file transfer system 1100.

FIG. 11 shows an exemplary file transfer system 1100 along with the communication network 10, the sender terminal 712, and the recipient terminal 130. The file transfer system 1100 includes a proxy server 1110 having the encoding processing section 114 and the management server 120. The file transfer system 1100 and the proxy server 1110 are an example of an electronic file transmission system.

The file transfer system 1100 differs from the file transfer system 1000 in that the server providing the file transfer service is formed by the proxy server 1110 and a file storage server 1130. In the following description of the file transfer system 1100, description of configurations that are identical to those of the mail transmission system 100, the mail transmission system 700, the mail transmission system 800, or the file transfer system 1000 may be omitted.

The proxy server 1110 differs from the file storage server 1010 in that the electronic file 20 or the encoded file 40 is stored in the file storage server 1130. Aside from this configurational difference, the proxy server 1110 may have the same configuration as the file storage server 1010. The file storage server 1130 stores the electronic file 20 or the encoded file 40. The processing performed by the file transfer system 1100 is the same as that of the file transfer system 1000, and therefore further description is omitted.

Figure 12:
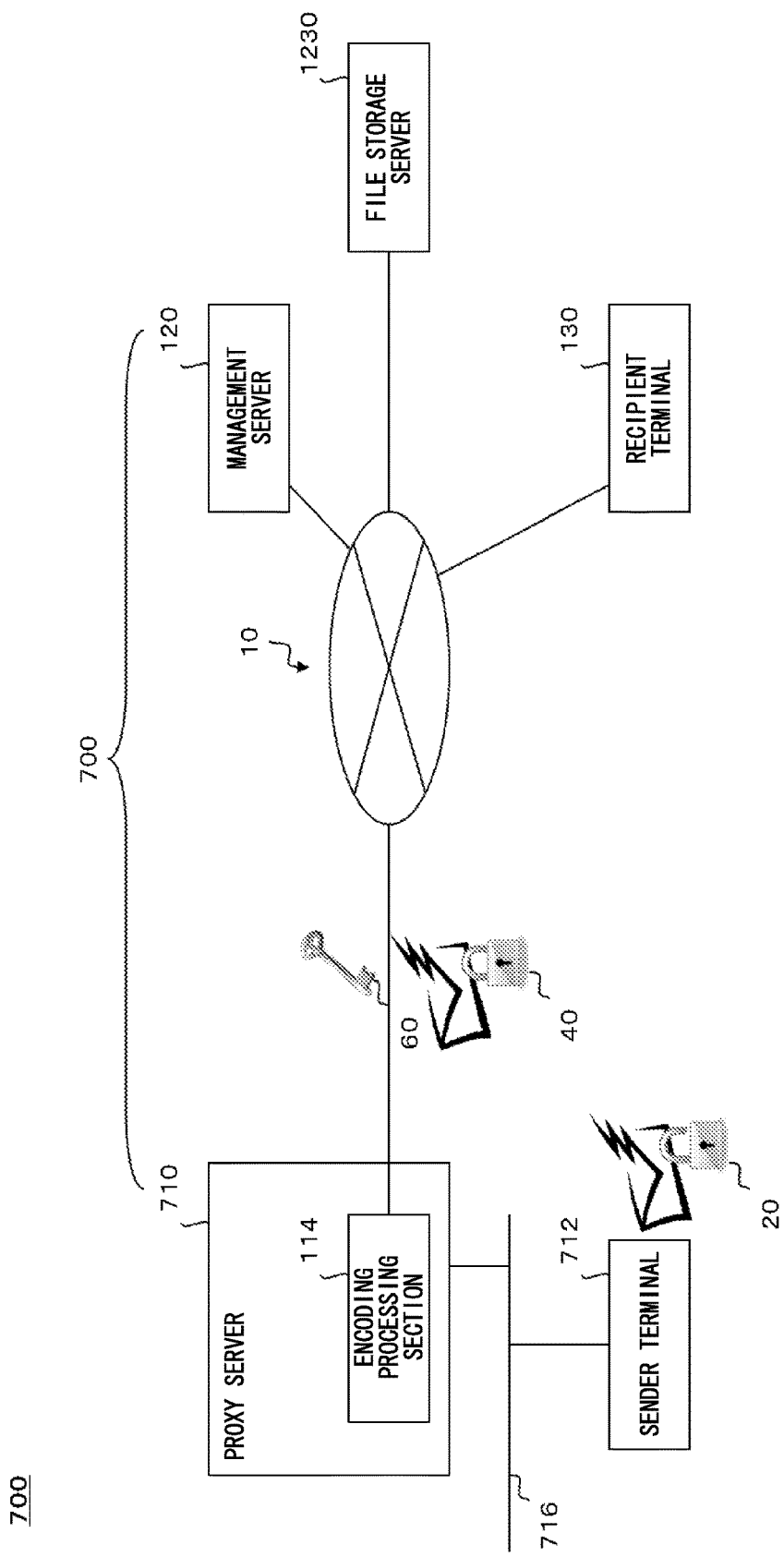
FIG. 12 is a schematic view of another exemplary mail transmission system 700.

FIG. 12 shows another exemplary mail transmission system 700 along with the communication network 10, the sender terminal 712, the LAN 716, and the recipient terminal 130. The mail transmission system 700 of the present embodiment differs from the mail transmission system 700 described in relation to FIG. 7 in that the proxy server 710 stores the encoded file 40 in a file storage server 1230 that provides a file transfer service.

The proxy server 710 of the present embodiment differs from the mail transmission system 700 described in relation to FIG. 7 in that the proxy server 710 of the present embodiment transmits to the management server 120 the management information including the pass phrase 60, transmits the main body of the e-mail to the recipient terminal 130, and transmits the encoded file 40 to the file storage server 1230. Furthermore, the proxy server 710 of the present embodiment also differs from the mail transmission system 700 described in relation to FIG. 7 in that upon receiving the management information, the management server 120 transmits to the recipient terminal 130 notification information indicating that the encoded file 40 can be transmitted. Concerning all other points, the proxy server 710 of the present embodiment may have the same configuration as the mail transmission system 700 described in relation to FIG. 7.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. An electronic file transmission system comprising:
   a data acquiring section, included in or in communication with a first communication terminal, that acquires data including an electronic file that is created or attached by the first communication terminal and transmitted to a second communication terminal via a network;
   an extracting section, included in or in communication with the first communication terminal, that extracts from the data the electronic file and recipient identification information identifying a correct recipient of the electronic file;
   an encoding section, included in or in communication with the first communication terminal, that encodes the extracted electronic file; and
   a management information transmitting section, included in or in communication with the first communication terminal, that transmits, via the network and not via the second communication terminal, a pass phrase needed to decode the encoded electronic file, first file identification information identifying the encoded electronic file, and the recipient identification information to a pass phrase management apparatus so as to make the pass phrase available to the correct recipient through subsequent transmission of the pass phrase from the pass phrase management apparatus to the second communication terminal; wherein
   the pass phrase management apparatus includes a determining section that determines whether the correct recipient indicated by the recipient identification information is not user-registered,
   the pass phrase management apparatus generates information needed for user registration in response to determining that the correct recipient indicated by the recipient identification information is not user-registered, and the pass phrase management apparatus includes a notification information transmitting section that transmits notification information including access information for the pass phrase management apparatus to the second communication terminal, the notification information including the information needed for user registration in response to the determination that the correct recipient indicated by the recipient identification information is not user-registered, and the encoding section deletes the electronic file from the e-mail acquired by the data acquiring section, creates the e-mail anew attached with the encoded file, and sends the new e-mail to the second communication terminal.

2. The electronic file transmission system according to claim 1, further comprising the pass phrase management apparatus, wherein the pass phrase management apparatus includes:

a management information storage section that stores the first file identification information, the pass phrase, and the recipient identification information in association with each other; and a recipient information acquiring section that acquires from the second communication terminal second file identification information identifying the electronic file for which the pass phrase is requested and user identification information identifying a user of the second communication terminal; wherein the determining section determines whether the user of the second communication terminal is the correct recipient of the electronic file, based on the recipient identification information, the first file identification information, the user identification information, and the second file identification information; and a pass phrase transmitting section that, when the determining section determines that the user of the second communication terminal is the correct recipient of the electronic file, transmits the pass phrase corresponding to the electronic file to the second communication terminal via the network.

3. The electronic file transmission system according to claim 1, wherein the notification information transmitting section transmits to the second communication terminal the notification information indicating the encoded electronic file has been transmitted to or can be transmitted to the second communication terminal.

4. The electronic file transmission system according to claim 2, wherein the notification information transmitting section transmits to the second communication terminal the notification information indicating that the encoded electronic file has been transmitted to or can be transmitted to the second communication terminal.

5. The electronic file transmission system according to claim 1, further comprising the first communication terminal, wherein the first communication terminal includes an electronic file transmitting section that transmits, via the network, the encoded electronic file to the second communication terminal, before or after the management information transmitting section transmits the first file identification information, the pass phrase, and the recipient identification information to the pass phrase management apparatus.

6. The electronic file transmission system according to claim 2, further comprising the first communication terminal, wherein the first communication terminal includes an electronic file transmitting section that transmits, via the network, the encoded electronic file to the second communication terminal, before or after the management information transmitting section transmits the first file identification information, the pass phrase, and the recipient identification information to the pass phrase management apparatus.

7. A non-transitive computer readable medium storing thereon a program for an electronic file transmission system, the program causing a computer to function as an electronic file transmission system comprising:

a data acquiring section, included in or in communication with a first communication terminal, that acquires data including an electronic file that is created or attached by the first communication terminal and transmitted to a second communication terminal via a network;

an extracting section, included in or in communication with the first communication terminal, that extracts from the data the electronic file and recipient identification information identifying a correct recipient of the electronic file;

an encoding section, included in or in communication with the first communication terminal, that encodes the extracted electronic file; and a management information transmitting section, included in or in communication with the first communication terminal, that transmits, via the network and not via the second communication terminal, a pass phrase needed to decode the encoded electronic file, first file identification information identifying the encoded electronic file, and the recipient identification information to a pass phrase management apparatus so as to make the pass phrase available to the correct recipient through subsequent transmission of the pass phrase from the pass phrase management apparatus to the second communication terminal; wherein the pass phrase management apparatus includes a determining section that determines whether the correct recipient indicated by the recipient identification information is not user-registered, the pass phrase management apparatus generates information needed for user registration in response to determining that the correct recipient indicated by the recipient identification information is not user-registered, and the pass phrase management apparatus includes a notification information transmitting section that transmits notification information including access information for the pass phrase management apparatus to the second communication terminal, the notification information including the information needed for user registration in response to the determination that the correct recipient indicated by the recipient identification information is not user-registered, and the encoding section deletes the electronic file from the e-mail acquired by the data acquiring section, creates the e-mail anew attached with the encoded file, and sends the new e-mail to the second communication terminal.

8. The computer readable medium according to claim 7, wherein the electronic file transmission system further comprises the pass phrase management apparatus, and the pass phrase management apparatus includes:

a management information storage section that stores the first file identification information, the pass phrase, and the recipient identification information in association with each other;

a recipient information acquiring section that acquires from the second communication terminal second file identification information identifying the electronic file for which the pass phrase is requested and user identification information identifying a user of the second communication terminal;

a determining section that determines whether the user of the second communication terminal is the correct recipient of the electronic file, based on the recipient identification information, the first file identification information, the user identification information, and the second file identification information; and a pass phrase transmitting section that, when the determining section determines that the user of the second communication terminal is the correct recipient of the electronic file, transmits the pass phrase corresponding to the electronic file to the second communication terminal via the network.

9. An electronic file transmission method comprising:

acquiring, by a data acquiring section included in or in communication with a first communication terminal, data including an electronic file that is created or attached by the first communication terminal and transmitted to a second communication terminal via a network;

extracting from the data, by an extracting section included in or in communication with the first communication terminal, the electronic file and recipient identification information identifying a correct recipient of the electronic file;

encoding, by an encoding section included in or in communication with the first communication terminal, the extracted electronic file; and transmitting, via the network and not via the second communication terminal, by a management information transmitting section included in or in communication with the first communication terminal, a pass phrase needed to decode the encoded electronic file, first file identification information identifying the encoded electronic file, and the recipient identification information to a pass phrase management apparatus so as to make the pass phrase available to the correct recipient through subsequent transmission of the pass phrase from the pass phrase management apparatus to the second communication terminal; wherein the pass phrase management apparatus determines whether the correct recipient indicated by the recipient identification information is not user-registered, generates information needed for user registration in response to determining that the correct recipient indicated by the recipient identification information is not user-registered, and transmits notification information including access information for the pass phrase management apparatus to the second communication terminal, the notification information including the information needed for user registration in response to the determination that the correct recipient indicated by the recipient identification information is not user-registered, and the encoding includes deleting the electronic file from the acquired e-mail, creating the e-mail anew attached with the encoded file, and sending the new e-mail to the second communication terminal.

10. The electronic file transmission method according to claim 9, further comprising:

storing, by the pass phrase management apparatus, the first file identification information, the pass phrase, and the recipient identification information in association with each other;

acquiring from the second communication terminal, by the pass phrase management apparatus, second file identification information identifying the electronic file for which the pass phrase is requested and user identification information identifying a user of the second communication terminal;

determining, by the pass phrase management apparatus, whether the user of the second communication terminal is the correct recipient of the electronic file, based on the recipient identification information, the first file identification information, the user identification information, and the second file identification information; and when the pass phrase management apparatus determines that the user of the second communication terminal is the correct recipient of the electronic file, transmitting, by the pass phrase management apparatus, the pass phrase corresponding to the electronic file to the second communication terminal via the network.

* * * * *